United States Patent [19]

McCrindle et al.

[11] Patent Number: 4,899,036
[45] Date of Patent: Feb. 6, 1990

[54] TRANSACTION SYSTEM

[75] Inventors: John A. McCrindle; Antony F. Steiner; Andrew M. Jackson, all of Chelmsford, England

[73] Assignee: The General Electric Company, p.l.c., London, England

[21] Appl. No.: 342,863

[22] Filed: May 22, 1989

Related U.S. Application Data

[62] Division of Ser. No. 849,296, Apr. 8, 1986, Pat. No. 4,845,347.

[30] Foreign Application Priority Data

Apr. 10, 1985 [GB] United Kingdom ............. 8509135

[51] Int. Cl.⁴ ............................................. G06K 5/00
[52] U.S. Cl. ................................. 235/380; 235/375; 235/487; 235/492
[58] Field of Search ............... 235/380, 375, 487, 492

[56] References Cited

U.S. PATENT DOCUMENTS

| | | |
|---|---|---|
| 3,906,460 | 3/1975 | Halpern . |
| 4,298,793 | 11/1981 | Melis .................................. 235/380 |
| 4,388,524 | 6/1983 | Walton .............................. 235/380 |
| 4,459,474 | 7/1984 | Walton .............................. 235/380 |
| 4,701,601 | 10/1987 | Francini ........................... 235/380 |

FOREIGN PATENT DOCUMENTS

| | | |
|---|---|---|
| 058029 | 9/1982 | European Pat. Off. . |
| 089087 | 5/1983 | European Pat. Off. . |
| WO83/03018 | 6/1983 | PCT Int'l Appl. . |
| 1543602 | 6/1979 | United Kingdom . |
| 1572845 | 4/1980 | United Kingdom . |
| 2130412 | 5/1984 | United Kingdom ............. 235/379 |
| 2092353 | 7/1984 | United Kingdom . |

Primary Examiner—Harold I. Pitts
Attorney, Agent, or Firm—Spencer & Frank

[57] ABSTRACT

A transaction system enables a portable token to cooperate with a fixed terminal. The token is inductively coupled to the terminal, and receives data from the terminal via a frequency modulated carrier signal. Data is sent from the token to the terminal by amplitude modulation of the carrier signal from the terminal, i.e. by modulating the power drawn by the token from the terminal. The power needed to energize the on-board processing capability of the token is also obtained from the terminal via the inductive coupling. The token includes an arrangement for commencing processor operation in an orderly manner when it is brought into the proximity of a terminal, and for providing an orderly shut down when the token is withdrawn.

33 Claims, 3 Drawing Sheets

TRANSACTION SYSTEM

This is a division of application Ser. No. 849,296 filed Apr. 8, 1986, now U.S. Pat. No. 4,845,347.

BACKGROUND OF THE INVENTION

This invention relates to a transaction system in which a portable token is used in conjunction with another device, often termed a terminal, to perform a transaction of some kind. At present, commonly available portable tokens are of a very simple passive kind and are often termed credit cards or service cards, the latter being usable in conjunction with data terminals to permit the withdrawal of cash from a bank account or the like. Tokens which are presently in common usage are passive, in the sense that they do not possess on-board processing or computing capability but instead carry an identity code which is compared by the co-operating data terminal with a code which is entered manually by the bearer of the token. This identity code comparison acts merely as a security check to confirm that the bearer of the token is indeed entitled to conduct the transaction. It has been proposed to enhance the usefulness and sophistication of such a token by including within it a data processing capability which would greatly extend the range of transactions and functions which it could be used to perform. The presence of such a capability on-board the token makes the interaction between it and the terminal much more critical and introduces difficulties which are not of real significance for a conventional passive credit card or cash dispenser card. The present invention seeks to provide an improved transaction system.

SUMMARY OF THE INVENTION

According to a first aspect of this invention, a transaction system includes a terminal; a token having an on-board data processing capability, means for inductively coupling the token with the terminal to permit data communication therebetween; means for transmitting data from the terminal to the token via a modulated carrier signal; and means for transmitting data from the token to the terminal by modulation of the level of the carrier signal at the terminal by the token as it draws power from the terminal.

This method of passing data from the token to the terminal avoids the need to include an autonomous power transmitter on board the token. Instead, the on-board data transmitter is entirely passive in the sense that it is merely necessary for it to modulate the load of a circuit tuned close to the frequency of the carrier signal which is transmitted to it by the terminal.

The system can take many forms, and the terminal may be a fixture associated with a retail outlet, a bank, or possibly mounted on a vehicle for the purpose of collecting fares or exacting tolls. It is envisaged that the transaction token itself will be very small, in the form of a thin device akin to the dimensions of a credit card so that it is easily portable and can be carried by a user without causing any inconvenience. To enable its bulk and weight to be minimised and to extend its useful operating life, preferably the power utilised by the on-board processors is obtained via said inductive coupling from the terminal, although if the token carries a volatile memory a small back-up electric cell may be needed to ensure preservation of the data during intervals between transactions.

According to a second aspect of this invention, a transaction system includes a terminal; a token having an on-board data processing capability; means for inductively coupling the token with the terminal to permit data communication therebetween and means associated with the terminal for transmitting a carrier signal and for detecting a variation in the power demand thereof which is indicative of the presence of an inductively coupled token.

This provision avoids the need for the terminal to continuously radiate the carrier signal at full power, regardless of whether the token is present. The terminal can normally operate on a very low level stand-by power and it is only when its inductive coupling system detects the presence of a token seeking to communicate with it that the power is raised to the operational level.

Since the power needed to energise the on-board processors of the token is derived from the terminal, means are provided on the token for monitoring the reception of this power to enable an orderly start-up of the processors to be initiated, and to provide an orderly shut-down in a manner which ensures preservation of data even in the event that the supply of power abruptly ceases due to the withdrawal of the token during the course of a transaction.

BRIEF DESCRIPTION OF THE DRAWINGS

The invention is further described by way of example with reference to the accompanying drawings, in which.

DESCRIPTION OF THE PREFERRED EMBODIMENTS

Figure 1:
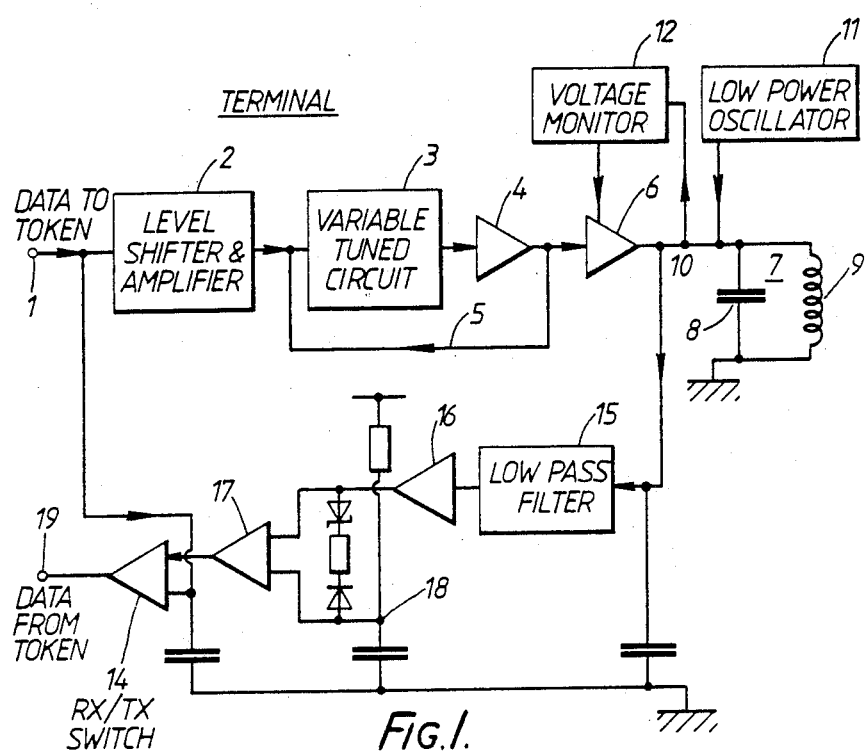
FIG. 1 shows part of a terminal intended to cooperate with a token.

Referring to FIG. 1 there is shown therein in schematic form a terminal which forms part of the system. The terminal is a permanent fixture in a building or vehicle and is intended to co-operate with a token or card having processing capabilities, and which is therefore sometimes referred to as a Smart Card. Parts of the token itself are shown in some detail in FIG. 3. Only those circuit parts of the terminal relevant to the way in which it co-operates with the token, and transmits and receives data therebetween, are shown in FIG. 1. Data which is to be transmitted to the token is received at an input port 1 and is fed to a level shifter and amplifier 2 which renders the data, which is in a binary format, suitable for transmission to a variable frequency tuned circuit 3 so as to provide a frequency modulation of an output frequency, with the frequency modulation being representative of the information content of the data. The output of the tuned circuit 3 feeds an amplifier 4, the output of which is fed back via a feed-back loop 5 to the input of the variable tuned circuit 3 so as to constitute an oscillator arrangement. The frequency modulated output of the amplifier 4 is fed to a power amplifier 6, and thence to a tuned circuit 7 which consists of a capacitor 8 and an inductive loop 9. The inductive loop 9 is of some importance as it is this which co-operates with the token. In practice, the loop is fairly large, possibly of the order of 15 cms by 15 cms, and consisting of a considerable number of conductive turns so as to enhance the inductive coupling with a similar but smaller coil carried by the token. The loop is set into the surface of the terminal on which the token is to be placed. If necessary, a location recess or the like is formed on the surface to ensure correct positioning of the token with respect to the loop.

The data is transmitted to the token as a frequency modulation, that is to say for binary digital data, a logic '1' state is represented by the transmission of one frequency from the tuned circuit 3, and a logic '0' state is represented by the transmission of a different frequency from the tuned circuit 3. It is arranged that the resonant frequency of the tuned circuit 7 lies between those two frequencies which represent the two logic states, so that the voltage level at point 10 is the same whichever frequency is being transmitted. This condition can be achieved by adjusting the value of the capacitor 8, and it has the effect of preventing the transmitted frequency modulation being converted directly into an amplitude modulation which could interfere with or be confused with the amplitude modulation signals originating with the token.

Prior to the transmission of the data which is applied to port 1, the terminal senses the proximity of a token by monitoring the power drawn by the token from the tuned circuit 7. The way in which the token modifies the power demand is explained in greater detail with reference to FIG. 3, but for the present purpose it is sufficient to note that the voltage at the point 10 decreases when a token is brought into close proximity with the inductive coil 9. During stand-by periods, a low-power oscillator 11 energises the tuned circuit 7 but being of low-power, its output voltage at point 10 drops significantly when the power radiated from the inductor 9 is absorbed by the token. The voltage at point 10 is monitored by a voltage monitor 12, which in response to a dip in voltage level, energises the amplifier 6 so as to enable full power to be transmitted via the inductive loop 9.

To guard against the possibility of the voltage monitor inadvertently being triggered in response to passing bodies which are not a co-operating token, it is convenient to include a time reset within the voltage monitor 12 so that after a period of a second or two the power is returned to that of the stand-by low-power oscillator 11 in the event that a transaction is not commenced.

Data is therefore transmitted from the terminal to the card by means of frequency modulation of the carrier signal generated by the tuned circuit 3. By way of contrast, data passing from the card to the terminal consists of amplitude modulation of the same carrier signal which is radiated by the inductive loop 9. Data received in this way by the tuned circuit 7 is fed via a low-pass filter 15 to an amplifier 16. The following amplifier 17 acts as a comparator to compare the amplitude variation from the amplifier 16 with an integrated average level at point 18. The resulting variation in output level is fed via a switch 14 to a data output port 19. The switch 14 is implemented in the form of a comparator which is rendered inoperative when data is present on input port 1. It is necessary to render the switch 14 inoperative whilst data is being transmitted from the terminal to the card, since although the data is transmitted nominally in the form of a frequency modulation, nevertheless some degree of amplitude modulation may inadvertently occur and this may cause interference with, or corruption of, information being provided at the terminal 19.

Figure 2:
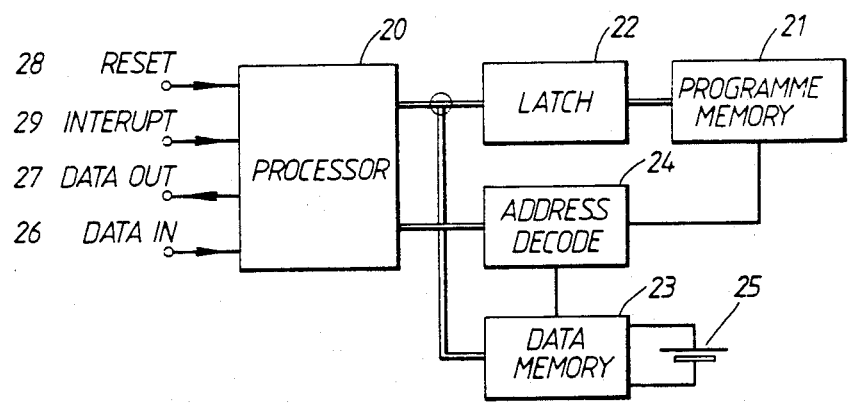
FIG. 2 shows the organisation of the processing arrangement on the token.

The organisation of the processing capability on the token is illustrated in FIG. 2 in which a central processor 20 communicates with a program memory 21 via a latch 22 and with a data memory 23. An address decoder 24 links the processor 20 with the memories 21 and 23. The organisation and operation of this processing arrangement may be fairly conventional. The processing system derives its power from the energy transmitted by the inductive coil 9 of the terminal illustrated in FIG. 1, but to permit retention of volatile memory whilst a token is not within range of the terminal, a small back-up electric battery cell 25 may be provided. As its sole function is to simply preserve memory, its power requirements are minimal, and a small cell will have a very long useful lifetime. Use of a non-volatile memory, such as an electrically alterable read only memory (EAROM), obviates the need for the cell 25.

Figure 3:
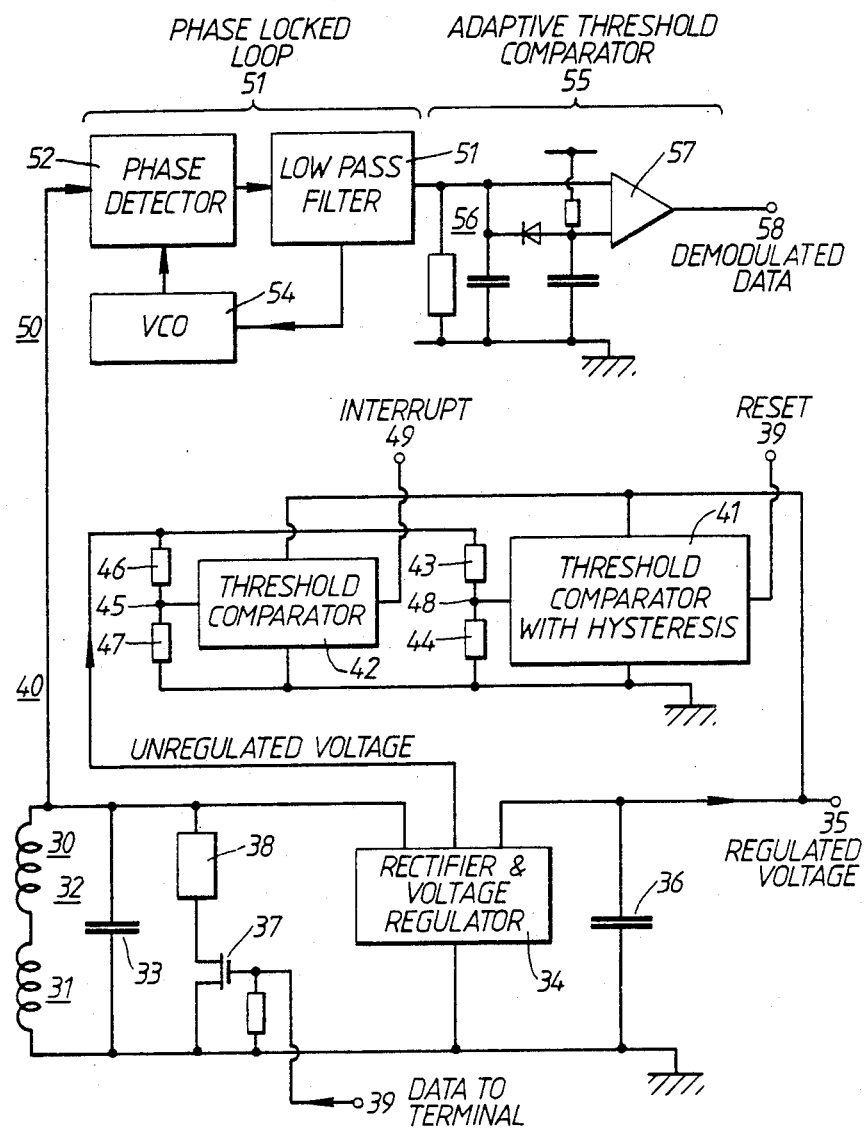
FIG. 3 shows parts of the token which co-operates with the terminal.

Data processed by those parts of the token which are to be described subsequently with reference to FIG. 3 are present on lead 26 as input data, whereas processed output data is provided on lead 27. Because the processor 20 derives its operational power from its proximity with the terminal, it is necessary to ensure an orderly start-up and shut-down of the processing arrangement as power becomes available and as power is withdrawn from it. Thus when the proximity of the terminal is detected, a signal is provided over reset lead 28 to initialise the processor 20 and to permit an orderly commencement of processing activity and communication with the terminal. Conversely, when the supply of power ceases, possibly by the token being abruptly withdrawn from the terminal by a user, an interrupt signal is presented over lead 29 and this gives a short interval enabling the processor 20 to close down without inadvertent loss of data. An orderly shut-down procedure need only take a millisecond or two during which power is available from a capacitive storage system, which is also illustrated diagramatically in FIG. 3.

With reference to FIG. 3, the token consists of a small piece of rectangular plastic card shaped after the manner of a currently available cash-card or the like. It contains two inductive loops 30 and 31 connected in series, one of which is placed upon the upper surface of the card and the other of which is placed upon the lower surface of the card, the coils being rectangular and running around the perimeter of the card itself. The coils are preferably provided with a thin protective plastic coating. The size of the loops and the card which carries them are arranged to be somewhat smaller than the cooperating coupling inductive loop 9 of the terminal, so that it is merely necessary for the card to be placed on a receiving surface of the terminal with the coils 30 and 31 lying within an area bounded by the loop 9. In this way, the token receives the power which is radiated by the loop 9, and it is this absorption of power which is detected by the voltage monitor 12 of the terminal, thereby causing the terminal to transfer from low-power stand-by to full power operation.

The energy received by the token shown in FIG. 3 is accepted by a tuned circuit 32 consisting of a capacitor 33 in addition to the coils 30 and 31. The power so obtained is passed to a rectifier and voltage regulator 34 which is operative to generate a regulated voltage which is made available to other parts of the token shown in FIG. 3 and also at port 35 for utilisation by the processor system illustrated in FIG. 2. A large smoothing capacitor 36 is provided at the output of the voltage regulator 34 to give some degree of power storage. This energy is utilised during shut-down of the processor as indicated previously and permits a required regulated voltage level to be available at port 35 for a millisecond or so after reception of inductively coupled power ceases.

As previously mentioned, data is transferred from the token to the terminal by causing an amplitude modulation at point 10 of the level of the carrier frequency radiated by the terminal. This is achieved by applying the data for transmission to port 39 which operates a transistor switch 37 to bring a load 38 into and out of circuit in shunt with the coils 30 and 31, thereby modifying the impedance of the tuned circuit 32.

Figure 4:
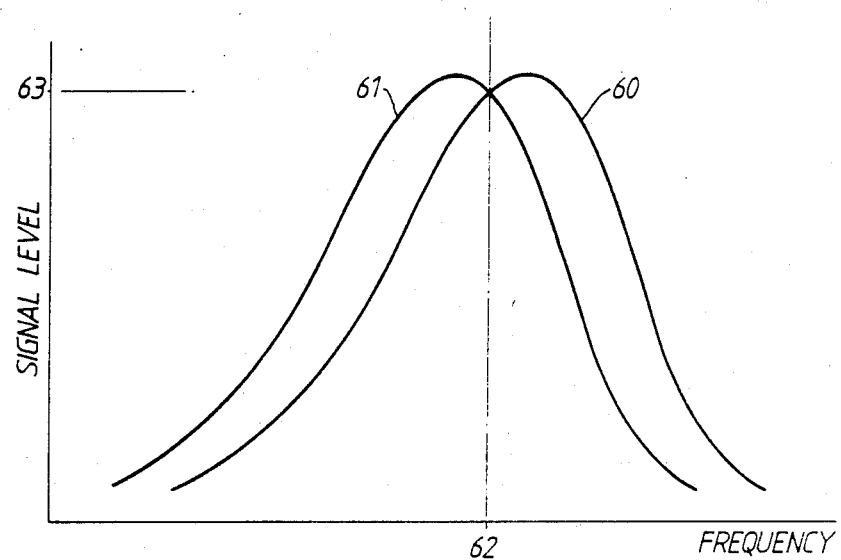
FIG. 4 is an explanatory diagram.

In this example, load 38 is a capacitor, so as to minimise resistive losses, and when it is switched into circuit as the switch 37 is made conductive it modifies the resonant frequency of the tuned circuit 32. Under both conditions, the tuned circuit 32 has fairly sharp resonance curves. These are shown in FIG. 4, the curve 60 corresponding to the condition existing when the switch 37 is non-conductive, and curve 61 applying when switch 37 is conductive. The carrier frequency received by the tuned circuit 32 from the terminal is indicated by point 62 on the frequency axis of FIG. 4, and this is equivalent to the transmission of the carrier having no frequency modulation. It is arranged that this frequency lies between the peak resonant frequencies of the two curves 60 and 61, so that at this frequency the signal level 63 produced across the capacitor 33 is the same whether or not the capacitor 38 is switched into circuit. This avoids an unwanted additional amplitude variation being imposed on the signal level which is sensed by the regulator 34. However, depending on whether the tuned circuit is operating on curve 60 or 61, the effect on the tuned circuit 7 at the terminal is different in the two cases, as a different resultant phase vector is produced at the tuned circuit 7 and consequently the impedance at point 10 is changed. Thus the signal level fed to the low pass filter 15 will vary as an amplitude modulation representing the received data, in response to the modulation imposed on the power which is drawn from the tuned circuit 7 by the tuned circuit 32 although the level of the power drawn will remain substantially constant whilst the signal level at point 10 varies due to the modulation of the phase.

The signal received by the tuned circuit 32 from the terminal is also fed to a power detection circuit 40 which consists primarily of two threshold comparators 41 and 42, the first of which monitors the received input voltage at a point 48 of a potentiometer 43, 44. When the potential on point 48 exceeds a reference value, a reset signal on output port 39 is altered to initiate operation of the processor 20. Thus the port 39 of FIG. 3 is connected to the lead 28 of FIG. 2. Comparator 41 has hysteresis so that it does not respond to minor or momentary changes or interruptions in the power received by the tuned circuit 32, and so that the reset signal reverts to its original state at a much lower input voltage level than that at which it initiates operation of the processor. It reverts at a voltage value which is less than that at which an interrupt signal is generated on port 49. In effect, therefore, the comparator 41 has a hysteresis loop in the sense that the state of the signal at port 39 reverts to its original value at an input voltage level which is lower than that at which operation of the procesor is initiated. The threshold comparator 42 monitors the potential 45 on potentiometer 46, 47 to detect withdrawal of the applied power. On detection of loss of voltage, the interrupt signal is generated at port 49 which is connected to lead 29, thereby causing an orderly shut-down of the processor whilst residual power is still available on capacitor 36 to permit this to be done. Thus the interrupt signal occurs at a voltage within the hysteresis loop of the comparator 41.

The power received by tuned circuit 32 also of course, contains frequency modulation during those periods when data is being transmitted from the terminal to the token, and this is fed to the signal detector 50, which consists of a phase lock loop 51, comprising a phase detector 52, a low-pass filter 53 and a voltage controlled oscillator 54. The phase lock loop 51 is operative in known manner to extract the received data. The level of the received data is controlled by means of the adaptive threshold comparator 55 which consists of an integrator circuit 56 feeding into a comparator 57. The demodulated data output is provided on port 58 which in effect is the same as lead 26 which is shown in FIG. 2.

It will be appreciated therefore, that the token is almost wholly autonomous, requiring no major power supply and being operative whenever it is placed in close proximity to an inductively radiating terminal having the correct frequency. This permits both the token and the terminal to be constructed in a very robust fashion having a very high degree of electronic integrity rendering it resistant to physical attack or fraud. These considerations may be of some significance if the token is used for transactions having appreciable values. The invention need not, however, be used for transactions having a monetary value, and the token can be used as a security pass or the like to enable the bearer to operate a door or automatic barrier to gain access to a restricted area. In this instance, the token can, if desired, record the nature of the area entered and the time of entry.

What is claimed is:

1. A transaction system including a terminal; a token having an on-board data processing capability; means for inductively coupling the token with the terminal to permit data communication therebetween; means for transmitting data from the terminal to the token via a modulated carrier signal; and means for transmitting data from the token to the terminal by modulation of the level of the carrier signal at the terminal by the token as it draws power from the terminal.

2. A system as claimed in claim 1 and wherein data is transmitted from the terminal to the token as a frequency modulation of the carrier signal.

3. A system as claimed in claim 2 and wherein reception of data from the token is inhibited at the terminal whilst the terminal is transmitting data to the token.

4. A system as claimed in claim 1 and wherein the terminal is provided with an inductive loop having a plurality of turns which is of larger area than a cooperating inductive loop mounted on the token.

5. A system as claimed in claim 4 and wherein the token is in the form of a plastic card having the inductive loop positioned around an edge thereof.

6. A system as claimed in claim 1, and wherein an inductive loop which is carried by the token is tuned to the mear frequency of said carrier signal, and means are provided for modifying the impedance of the loop in accordance with the data which is to be transmitted from the token to the terminal.

7. A system, as claimed in claim 6 and wherein the loop is switchably tuned between two predetermined frequency characteristics which represent the two binary states of data transmitted from the token to the terminal, the voltage level developed at said loop being substantially the same for the two frequency characteristics.

8. A system as claimed in claim 7, and wherein the loop is switchably tuned by switchably altering the reactance of a tuned circuit of which the loop forms a part.

9. A system as claimed in claim 5, and wherein the inductive loop at the terminal forms part of a tuned circuit which is tuned to a resonant frequency which lies between two frequencies which represent different binary data states of the frequency modulation with which data is transmitted to the token.

10. A system as claimed in claim 9, and wherein the signal level developed across the tuned circuit is substantially the same for the said two frequencies.

11. A system as claimed in claim 1, and wherein the carrier signal which is received by the token is used as its source of power to energise its on-board processing capability.

12. A terminal adapted for use with the system claim 1.

13. A token adapted for use with the system of claim 1.

14. A system as claimed in claim 2 and wherein the terminal is provided with an inductive loop having a plurality of turns which is of larger area than a cooperating inductive loop mounted on the token.

15. A system as claimed in claim 3 and wherein the terminal is provided with an inductive loop having a plurality of turns which is of larger area than a cooperating inductive loop mounted on the token.

16. A system as claimed in claim 2 and wherein an inductive loop which is carried by the token is tuned to the mean frequency of said carrier signal, and means are provided for modifying the impedance of the loop in accordance with the data which is to be transmitted from the token to the terminal.

17. A transaction system, comprising:
a terminal which includes
 a first tuned circuit having a first inductor, first means, connected to the first tuned circuit, for modulating data to be transmitted by the first inductor, and
 second means, connected to the first tuned circuit, for detecting data received by the first inductor; and
a token which includes
 a second tuned circuit having a second inductor which can be inductively coupled to the first inductor,
 a third means, connected to the second tuned circuit, for demodulating data received by the second inductor,
 fourth means, connected to the second tuned circuit, for selectively varying a predetermined characteristic of the second tuned circuit in order to transmit data to the first inductor, and
 fifth means, connected to the second tuned circuit, for receiving energy from the first inductor to power circuitry included in the token.

18. The system of claim 17, wherein the data to be transmitted by the first inductor is digital data in serial form and has first and second logical levels, wherein the first means comprises means for applying a first signal across the first tuned circuit when the data to be transmitted by the first inductor is at the first logical level and for applying a second signal across the first tuned circuit when the data to be transmitted is at the second logical level, the first signal having a first frequency and the second signal having a second frequency that is different from the first frequency, and wherein the resonance frequency of the first tuned circuit is selected so that the signal level across the first tuned circuit is substantially constant regardless of whether the data to be transmitted by the first inductor is at the first logical level or the second logical level.

19. The system of claim 18, wherein the resonance frequency of the first tuned circuit is betweeen the first and second frequencies.

20. The system of claim 18, wherein the signal level across the first tuned circuit varies when data is transmitted to the first inductor, and wherein the second means comprises means for sensing level changes across the first tuned circuit.

21. The system of claim 20, wherein the data transmitted to the first inductor is digital data in serial form and has first and second logical levels, and wherein the means for sensing level changes across the first tuned circuit comprises means for low pass filtering the signal across the first tuned circuit, and means for comparing the low pass filtered signal to the integrated average of the low pass filtered signal.

22. The system of claim 18, wherein the means for applying the first and second signals across the first inductor comprises an amplifier having an enable input terminal, wherein the signal level across the first tuned circuit drops when the token is moved to the terminal and the first and second inductors become inductively coupled, and wherein the terminal further comprises low power oscillator means for driving the first tuned circuit when the first and second inductors are not inductively coupled, and means connected to the enable input terminal of the amplifier for monitoring the signal level across the first tuned circuit to detect a signal level drop, the amplifier being enabled when a signal level drop is detected.

23. The system of claim 17, wherein the predetermined characteristic of the second tuned circuit is its resonance frequency, and wherein the fourth means comprises means for selectively varying the resonance frequency of the second tuned circuit.

24. The system of claim 17, wherein the fourth means comprises an impedance element, and means responsive to data to be transmitted to the first inductor for selectively connecting the impedance element across the second tuned circuit.

25. The system of claim 17, wherein the token further comprises on-board data processing circuitry, voltage detection means connected to the fifth means for initiating operation of the data processing circuitry when the detected voltage rises above a threshold level, and means for shutting down the operation of the data processing circuitry in an orderly manner when the detected voltage falls below a threshold level.

26. A token for use with a terminal which includes a first tuned circuit having a first inductor, first means connected to the first tuned circuit for modulating data to be transmitted by the first inductor, and second means connected to the first tuned circuit for detecting data received by the first inductor, said token comprising:

a second tuned circuit having a second inductor which can be inductively coupled to the first inductor;

third means, connected to the second tuned circuit, for demodulating data received by the second inductor;

fourth means, connected to the second inductor, for selectively varying a predetermined characteristic of the second tuned circuit in order to transmit data to the first inductor; and fifth means, connected to the second tuned circuit, for receiving energy from the first inductor to power circuitry included in the token.

27. The token of claim 26, wherein the predetermined characteristic of the second tuned circuit is its resonance frequency, and wherein the fourth means comprises means for selectively varying the resonance frequency of the second tuned circuit.

28. The token of claim 26, wherein the fourth means comprise an impedance element, and means responsive to data to be transmitted to the first inductor for selectively connecting the impedance element across the second tuned circuit.

29. The token of claim 26, further comprising on-board data processing circuitry, voltage detection means connected to the fifth means for initiating operation of the data processing circuitry when the detected voltage rises above a threshold level, and means for shutting down the operation of the data processing circuitry in an orderly manner when the detected voltage falls below a threshold level.

30. A terminal for use with a token which includes a first tuned circuit having a first inductor, first means connected to the first tuned circuit for demodulating data received by the first inductor, second means connected to the first tuned circuit for selectively varying a predetermined characteristic of the first tuned circuit in order to transmit data, and third means connected to the first tuned circuit for receiving energy to power circuitry included in the token, said terminal comprising:

a second tuned circuit having a second inductor to which the first inductor can be inductively coupled;

fourth means, connected to the second tuned circuit, for modulating data to be transmitted by the second inductor, wherein the data to be transmitted by the second inductor is digital data in serial form and has first and second logical levels, and wherein the fourth means includes means for applying a first signal across the second tuned circuit when the data to be transmitted by the second inductor is at the first logical level and for applying a second signal across the second tuned circuit when the data to be transmitted is at the second logical level, the first signal having a first frequency and the second signal having a second frequency that is different from the first frequency, the first and second frequencies being selected so that the signal level across the second tuned circuit is substantially constant regardless of whether the data to be transmitted by the second inductor is at the first logical level or the second logical level; and fifth means, connected to the second tuned circuit, for detecting data received by the second inductor, wherein the signal level across the second inductor varies when data is transmitted to the second inductor, and wherein the fifth means includes means for sensing level changes across the second tuned circuit.

31. The terminal of claim 30, wherein the data transmitted to the second inductor is digital data in serial form and has first and second logical levels, and wherein the means for sensing level changes across the second tuned circuit comprises means for low pass filtering the signal across the second tuned circuit and means for comparing the low pass filtered signal to the integrated average of the low pass filtered signal.

32. The terminal of claim 30, wherein the means for applying the first and second signals across the second inductor comprises an amplifier having an enable input terminal, wherein the signal level across the second tuned circuit drops when the token is moved to the terminal and the first and second inductors become inductively coupled, and further comprising low power oscillator means for driving the second tuned circuit when the first and second inductors are not inductively coupled, and means connected to the enable input terminal of the amplifier for monitoring the signal level across the second tuned circuit to detect a signal level drop, the amplifier being enabled when a signal level drop is detected.

33. A system as claimed in claim 1, and wherein the means for transmitting data from the terminal to the token via a modulated carrier signal comprises means for transmitting data in digital form by frequency modulating the carrier signal.

* * * * *